P. MARGOLFO.
GRATING DEVICE.
APPLICATION FILED AUG. 3, 1920.
1,359,410.
Patented Nov. 16, 1920.
2 SHEETS—SHEET 1.
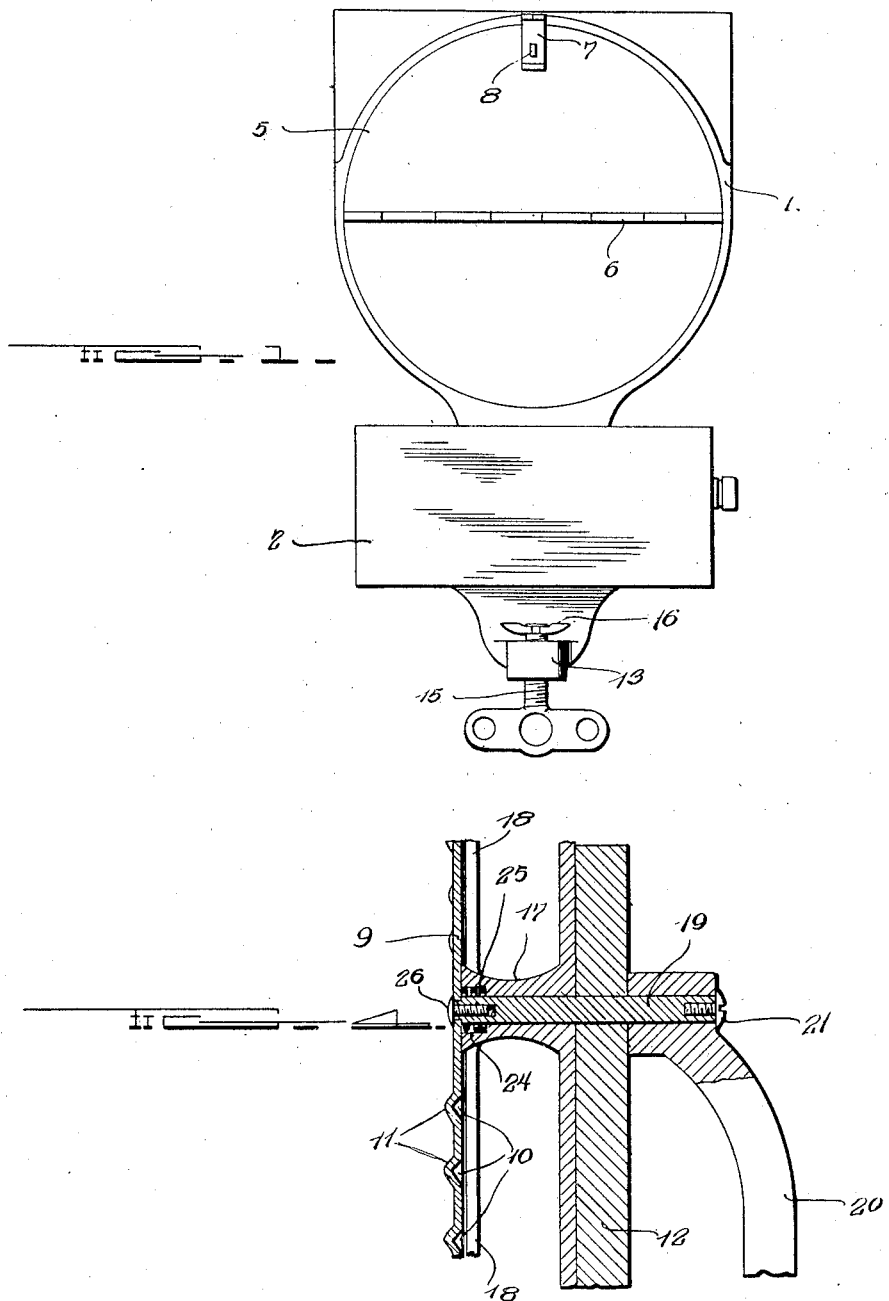
Polidoro Margolfo
INVENTOR
BY Victor J. Evans
ATTORNEY
WITNESS

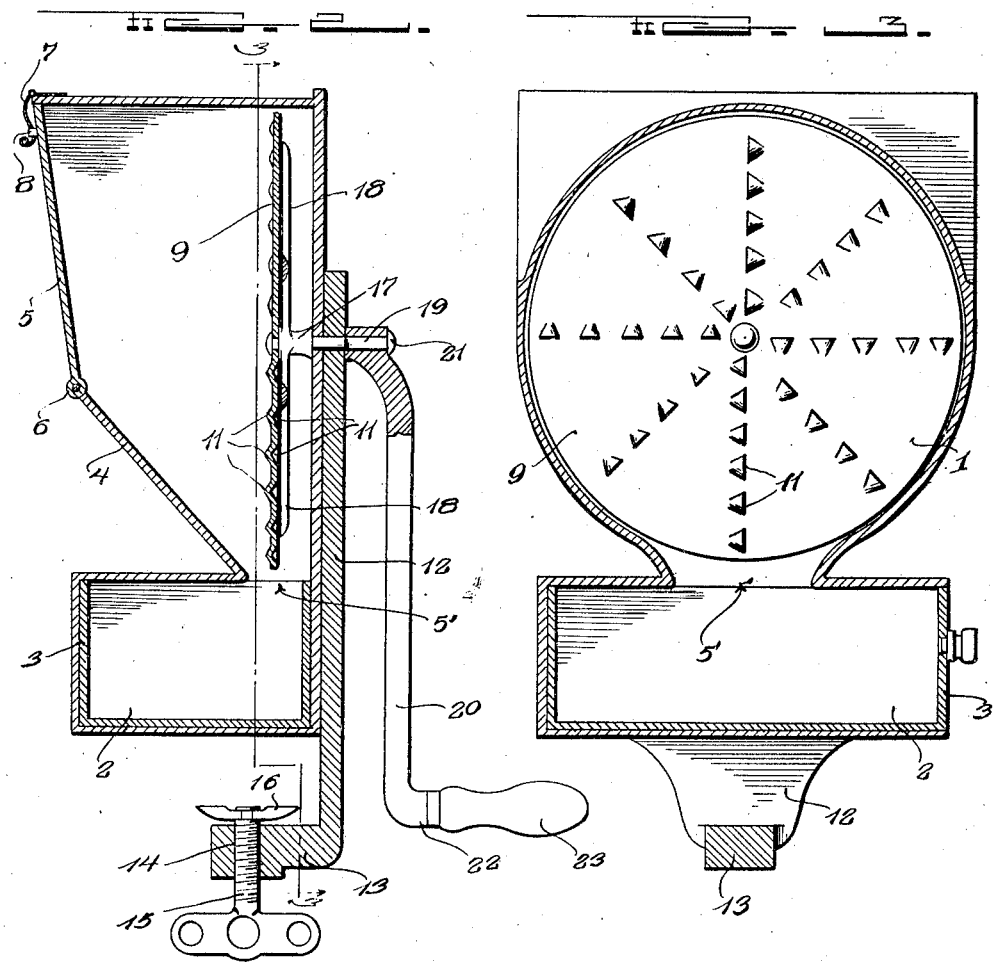

UNITED STATES PATENT OFFICE.

POLIDORO MARGOLFO, OF MERIDEN, CONNECTICUT.

GRATING DEVICE.

1,359,410.  Specification of Letters Patent.  Patented Nov. 16, 1920.

Application filed August 3, 1920. Serial No. 400,916.

*To all whom it may concern:*

Be it known that I, POLIDORO MARGOLFO, a subject of the King of Italy, residing at Meriden, in the county of New Haven and State of Connecticut, have invented new and useful Improvements in Grating Devices, of which the following is a specification.

My present invention has reference to an improved grater for grating cheese, bread, etc.

The object is the production of an extremely simple, cheap and efficient grating device.

A further object is the production of a grating device which may be clamped to a table or like support, and in which the grating chamber is so arranged as to feed the material to be grated to a grating wheel, and to automatically deliver the same therefrom into a receptacle provided therefor.

A further object is the production of a grating device in which a scraper is arranged to the rear of the revoluble grating disk, and the said disk is adjustable toward or away from the scraper, whereby different sized crumbs may be obtained from the article that is grated.

The foregoing, and other objects which will appear as the nature of the invention is better understood, may be accomplished by a construction, combination and operative arrangement of parts, such as is disclosed by the drawings, accompanying and forming part of this application.

In the drawings:—

Figure 1 is a front elevation of a grating device constructed in accordance with this invention.

Fig. 2 is a central vertical longitudinal sectional view therethrough.

Fig. 3 is a sectional view on the line 3—3 of Fig. 2.

Fig. 4 is a greatly enlarged sectional view through the central portion of the grater disk illustrating the manner in which it is sustained adjustable with respect to the scraper.

My improvement contemplates the employment of a grater chamber and a chamber for receiving the gratings. Preferably these members are integrally formed.

The grating chamber is indicated by the numeral 1, and is located above the receiving chamber 2. This last mentioned chamber has one of its ends open and receives therethrough a slidable drawer 3 which receives the gratings.

The grater chamber 1 has its lower front wall inclined, as at 4 to the rear top portion of the receiving chamber 2, and an opening 5' provides a communication between the chambers 1 and 2. The upper portion of the outer face of the grater chamber 1 is preferably arranged at an outward inclination and is open, but is closed by a door 5 that is hinged to the lower portion thereof, as at 6, and said door is retained in closed position by a latch 7 carried by the top of the casing and engaging a keeper 8 on the door 5. Through the opening that is closed by the door 5 the material to be grated is fed, and the inclined lower wall 4 of the said chamber 1 will direct the material to the grater disk.

The grater disk, indicated by the numeral 9, comprises a flat member that is formed, throughout the surface thereof with openings 10, preferably formed by indenting the disk from the back thereof so that the outer faces of the openings are surrounded by grating prongs or teeth 11. The teeth 11 are preferably arranged at an angle, as disclosed by the drawings.

Preferably, but not necessarily, the rear wall of the chambers 1 and 2 is reinforced by a plate 12. The plate extends a suitable distance below the bottom of the receiving chamber 2, and has an inwardly inclined end 13 provided with a threaded opening 14 in which is received a screw 15 that has a head 16 swiveled on its inner end. The head 16 is disposed opposite the lower wall of the receiving chamber 2, so that when the receiving chamber rests on a support the screw may be manipulated to cause the head 16 thereof to contact with the under face of the support, and thus effectively sustain the grater thereon.

The inner wall of the grater chamber is approximately centrally provided with an inturned boss 17 from which radiates arms 18, the said arms providing the scraper elements. The boss is provided with a bore that communicates with an opening in the back of the chamber 1 and with an alining opening in the plate 12. Through this opening passes a shaft 19. The shaft has both of its ends squared in cross section and provided with threaded apertures arranged centrally at its said ends.

The operating member for the grater disk includes a lever 20 that has an offset end provided with a squared opening that receives one of the squared ends of the shaft 19. A headed screw 21 enters the threaded aperture at the end of the said shaft and holds the lever 20 thereon. The opposite end of the lever 20 has an outwardly extending pintle 22 that provides a bearing for a handle 23. The boss 17, on its inner face is provided with a pocket 24. In this pocket is a compressible element, preferably in the nature of a spiral spring 25. This spring exerts a tension against the rear face of the grater disk 9. The grater disk is centrally provided with a squared opening to receive the inner squared end of the shaft 19, a headed screw or bolt 26 holding the disk on the shaft. By adjusting the screw 26 it will be noted that the disk may be moved on the shaft against the influence of the compressible element or spring 25, toward the scraper elements 18, or when turned in another direction, the spring element 25 will force the disk outwardly or away from the scraper elements. In this manner the gratings or crumbs of the material which is grated can be scraped from the disk at varying lengths, and thus the size of the crumbs or gratings may be easily regulated. The feed is practically automatic, incident to the inclined wall 4 of the chamber 1, although, if desired, the door 5 may be retained open and the material to be grated may be pressed against the disk. The spring 25 is of sufficient strength to prevent the inward movement of the disk on the shaft even when hardened material is engaged thereby for grating, and it is to be understood that it is within the scope of this invention for providing means other than the spring and the screw which adjust the disk of the shaft, for regulating the distance between the grater disk and scraper.

Having thus described the invention, what I claim, is:—

1. A revoluble grater disk, a scraper therebehind, and means for adjusting the disk toward or away from the scraper.

2. A revoluble grater disk, a scraper therebehind, and receiving the shaft for the disk therethrough, means on the scraper for normally influencing the disk therefrom, and means between the scraper and its shaft for adjusting the position of the disk with respect to the scraper.

3. A grating device including a grating chamber and a receiving chamber communicating therewith, said grating chamber having the lower portion of its outer wall inclined inwardly toward the receiving chamber, a revoluble grating disk in the grating chamber, a scraper therebehind, and means for adjusting the disk toward or away from the scraper.

4. A grating device including a grating chamber having a lower inwardly inclined wall and a receiving chamber communicating with the grating chamber, a revoluble grater disk in the grating chamber, a scraper comprising radially disposed members to the rear of the disk, means for adjusting the disk toward or away from the scraper elements, and means to the rear of the casings for revolving the disks.

In testimony whereof I affix my signature.

POLIDORO MARGOLFO.